UNITED STATES PATENT OFFICE.

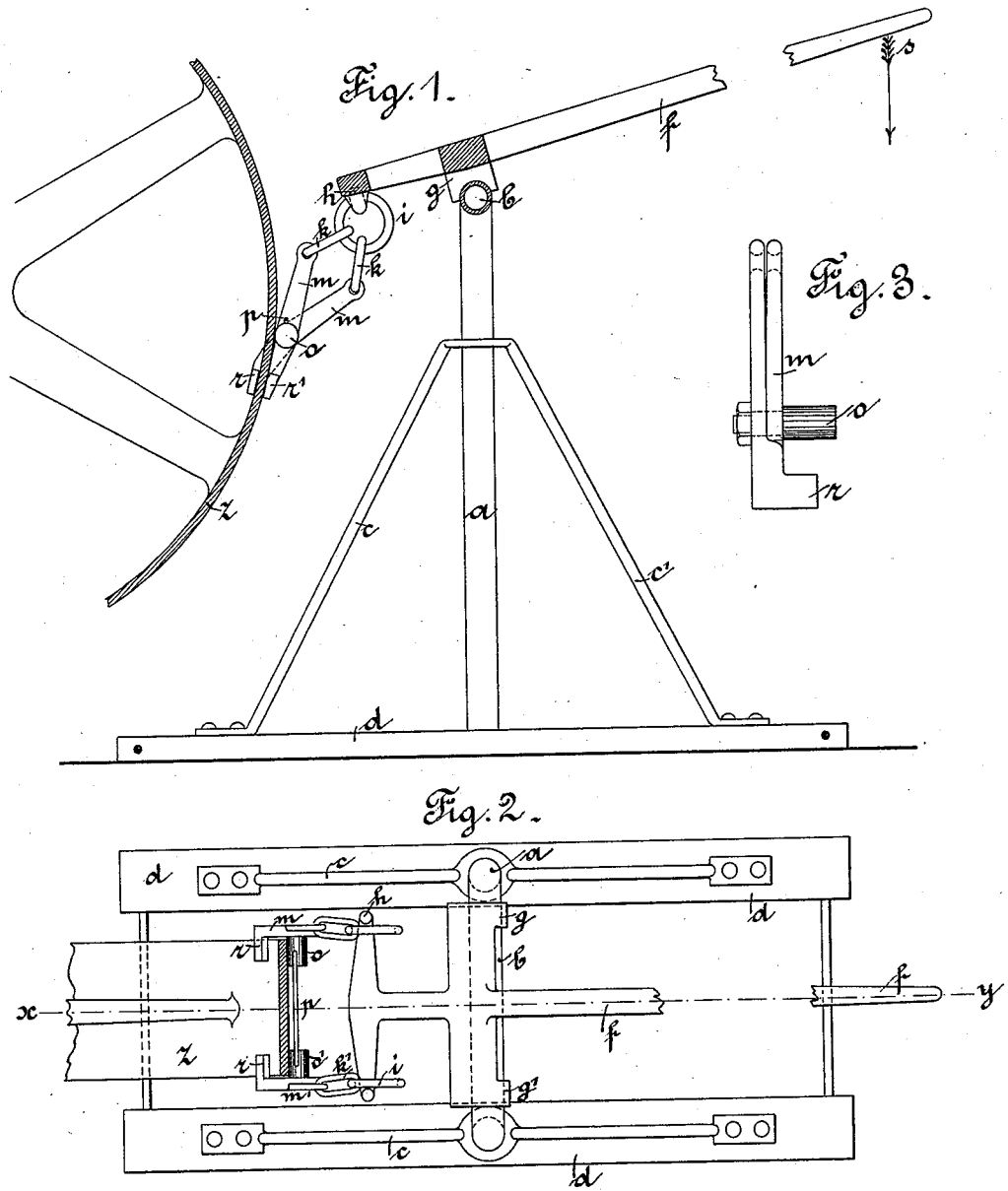

JOHN DONNELLY, OF MONTREAL, CANADA.

APPARATUS FOR STARTING ENGINES.

SPECIFICATION forming part of Letters Patent No. 557,259, dated March 31, 1896.

Application filed July 20, 1895. Serial No. 556,618. (No model.) Patented in Canada December 2, 1895, No. 50,696.

*To all whom it may concern:*

Be it known that I, JOHN DONNELLY, a citizen of Canada, residing at Montreal, in the Province of Quebec, Canada, have invented a new and useful Apparatus for Starting Engines, of which the following is a specification.

A patent for this invention has been granted in Canada, No. 50,696, dated December 2, 1895.

The object of my invention is to enable the starting or the turning of any heavy engine over the dead-center not especially provided with a starting apparatus.

Referring to the drawings, which form a part of this specification, Figure 1 is a section according to line $x\ y$. Fig. 2 is a plan view of the entire apparatus. Fig. 3 shows a side view of a clip.

Similar letters refer to similar parts throughout the several views.

By means of specially-constructed clips suitably connected with a hand-lever any smooth-faced wheel or pulley can be turned, setting the engine and its connected shafting in motion.

On the frame $a\ b\ c\ d$, consisting of a U-shaped tube $a$, stiffened by guys $c\ c'$ and fastened on foot-beam $d$, rests the double-cross-shaped hand-lever $f$. The cross-arms $g\ g'$ are bent downward and suitably hollowed, so as to fit the frame-tube $b$, which acts as the fulcrum of lever $f$. The ends of the other cross-arms of lever $f$ are bent upward in order to make a secure resting-place for the two rings $i$. To these rings $i$ two grippers or clips $m\ m'$ are fastened by means of links $k\ k'$. The clips $m\ m'$ have the form of tongs with bent grippers, as $r\ r'$, for the purpose of catching the flange of the pulley $z$ which is to be turned.

In the pivot of the clips $m\ m'$ a bolt $o\ o'$ is provided, which lies against the surface of the pulley $z$ or fly-wheel when the lever $f$ is raised.

The above-described arrangement produces the following effect: If the frame $a\ b\ c\ d$ with lever $f$ is brought sufficiently near to the pulley which has to be turned, the clips $m\ m'$ are slipped over the edge of the flange, holding it between grippers $r\ r'$. If the lever $f$ is lowered from the upper end of $s$ in the direction of the arrow, the rings $i$ raise the clips $m\ m'$; but at the same moment the links $k\ k'$ converge and close the clips, causing a sufficient friction between the grippers $r\ r'$ to turn the wheel $z$. This action is assisted by the pins $o\ o'$, which press at the same moment against the outside surface of the pulley $z$. If the lever $f$ at $s$ is raised, causing $h$ to be lowered, the clips $m\ m'$ open and slide down, when the operation can be again repeated by lowering the lever $f$ at $s$, as mentioned above.

In order to facilitate and to keep in the proper position the clips $m\ m'$, a pin $p$ is put in two holes of bolts $o$ and $o'$, holding them together.

Having now described my invention, what I claim as new, and desire to secure by Letters Patent, is—

1. In an engine-starter, the combination, with a frame, and a lever pivoted thereon and provided with a T-shaped end; of two pairs of grippers connected one to each end of the said T-shaped end of the lever, and provided with projecting guide-pins operating to slide against the face of the engine fly-wheel and to keep the jaws of the grippers in engagement with its edges, substantially as set forth.

2. In an engine-starter, the combination, with a frame, and a lever pivoted thereon and provided with a T-shaped end; of two pairs of grippers connected one to each end of the said T-shaped end of the lever, and provided with projecting guide-pins operating to slide against the face of the engine fly-wheel and to keep the jaws of the grippers in engagement with its edges, and a pin $p$ engaging with the said guide-pins, substantially as set forth.

JOHN DONNELLY.

Witnesses:
   CORNELIUS JOHN MCCALLUM,
   A. V. GLAZEBROOK.